(12) United States Patent
Dourval et al.

(10) Patent No.: US 11,837,074 B2
(45) Date of Patent: Dec. 5, 2023

(54) ASPIRATING SMOKE DETECTOR DEVICE OPERATIONAL ANALYSIS

(71) Applicant: Honeywell International Inc., Charlotte, NC (US)

(72) Inventors: Clement Dourval, Charlotte, NC (US); Daniele Sbardellini, Padua (IT); Mauro Miheli, Trieste (IT); Sandesh Hemmuru Devaraja, Benguluru (IN); Simone Gasparella, Trieste (IT); Domenico Piro, Trieste (IT); Erika Simeoni, Trieste (IT); Reet Kaur, Ghaziabad (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/701,925

(22) Filed: Mar. 23, 2022

(65) Prior Publication Data

US 2023/0072959 A1 Mar. 9, 2023

Related U.S. Application Data

(63) Continuation of application No. 17/467,965, filed on Sep. 7, 2021, now Pat. No. 11,610,472.

(51) Int. Cl.
*G08B 29/00* (2006.01)
*G08B 29/14* (2006.01)
(Continued)

(52) U.S. Cl.
CPC ......... *G08B 29/145* (2013.01); *G06F 3/0484* (2013.01); *G08B 17/10* (2013.01); *H04W 4/38* (2018.02); *H04W 4/80* (2018.02)

(58) Field of Classification Search
CPC ..... G08B 29/145; G08B 17/10; G06F 3/0484; H04W 4/38; H04W 4/80
See application file for complete search history.

(56) References Cited

U.S. PATENT DOCUMENTS 4,173,886 A * 11/1979 Archbold ........... G01N 33/0011
73/31.02
10,567,445 B2 2/2020 Logue et al.
(Continued)

FOREIGN PATENT DOCUMENTS

| CN | 201796460 | 4/2011 |
| CN | 102314745 | 1/2012 |
| CN | 204511522 | 7/2015 |

OTHER PUBLICATIONS

Wagner Group GmbH; Air Sampling Smoke Detection System: Titanus Top Sens #174, Rev. A, Technical Manual, (Apr. 30, 2009) (214 pgs).

*Primary Examiner* — Ojiako K Nwugo
(74) *Attorney, Agent, or Firm* — Brooks, Cameron & Huebsch, PLLC

(57) ABSTRACT

Methods, devices, and systems for an aspirating smoke detector device operational analysis are described herein. One device includes a memory, and a processor to execute executable instructions stored in the memory to receive operational information associated with an aspirating smoke detector device and generate, using the received operational information, an aspirating smoke detector device operational analysis including a real-time operational parameter associated with the aspirating smoke detector device, and a user interface configured to display the aspirating smoke detector device operational analysis.

19 Claims, 7 Drawing Sheets

(51) Int. Cl.
  *H04W 4/38* (2018.01)
  *H04W 4/80* (2018.01)
  *G06F 3/0484* (2022.01)
  *G08B 17/10* (2006.01)

(56) References Cited

U.S. PATENT DOCUMENTS

| | | | | |
|---|---|---|---|---|
| 10,929,735 | B1* | 2/2021 | Zarakas | G06K 19/0702 |
| 10,943,444 | B2 | 3/2021 | Boyd et al. | |
| 11,143,641 | B1* | 10/2021 | Templeton | G01N 27/12 |
| 11,231,402 | B2* | 1/2022 | Deininger | G01N 33/007 |
| 2006/0220886 | A1* | 10/2006 | Robertson | G08B 17/10 |
| | | | | 340/577 |
| 2006/0261967 | A1* | 11/2006 | Marman | G08B 29/26 |
| | | | | 340/630 |
| 2009/0128327 | A1* | 5/2009 | Lang | G08B 29/26 |
| | | | | 340/541 |
| 2010/0050744 | A1* | 3/2010 | Petrovic | G01N 21/3504 |
| | | | | 73/31.06 |
| 2011/0074590 | A1* | 3/2011 | Sacknoff | G08B 17/10 |
| | | | | 340/10.5 |
| 2011/0161885 | A1* | 6/2011 | Gonia | G08B 21/12 |
| | | | | 715/764 |
| 2013/0213114 | A1* | 8/2013 | Wetzig | G01N 25/20 |
| | | | | 73/25.03 |
| 2014/0015680 | A1* | 1/2014 | Chandler | G08B 29/26 |
| | | | | 340/630 |
| 2014/0318218 | A1 | 10/2014 | Susel et al. | |
| 2016/0225251 | A1* | 8/2016 | Di Marco | G08B 29/145 |
| 2017/0154518 | A1* | 6/2017 | Prabhakar | G08B 7/06 |
| 2018/0301013 | A1* | 10/2018 | Wang | G01N 33/0075 |
| 2019/0035253 | A1* | 1/2019 | Jones, II | H04Q 9/02 |
| 2019/0124194 | A1* | 4/2019 | Stolte | H04M 1/72457 |
| 2019/0221101 | A1* | 7/2019 | Golob | H04W 4/80 |
| 2019/0234924 | A1* | 8/2019 | Anto | G01N 33/0063 |
| 2020/0226916 | A1 | 7/2020 | Lim et al. | |
| 2020/0320857 | A1 | 10/2020 | Lang et al. | |
| 2020/0363383 | A1* | 11/2020 | Chow | G01N 33/0006 |
| 2020/0402381 | A1* | 12/2020 | Nelson | G08B 7/06 |
| 2021/0056834 | A1* | 2/2021 | Wolff | H04W 76/11 |
| 2021/0104140 | A1* | 4/2021 | Park | G08B 17/117 |
| 2021/0142654 | A1* | 5/2021 | Lobo | G08B 29/145 |
| 2021/0259287 | A1* | 8/2021 | Schmehl | H04W 4/80 |
| 2021/0302267 | A1* | 9/2021 | Tao | G01M 3/04 |
| 2021/0318014 | A1* | 10/2021 | Helbling | F24F 11/46 |

* cited by examiner

ASPIRATING SMOKE DETECTOR DEVICE OPERATIONAL ANALYSIS

PRIORITY INFORMATION

This application is a Continuation of U.S. application Ser. No. 17/467,965, filed Sep. 7, 2021, the contents of which are incorporated herein by reference in its entirety.

TECHNICAL FIELD

The present disclosure relates to methods, devices, and systems for an aspirating smoke detector device operational analysis.

BACKGROUND

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire control panel) and a plurality of aspirating smoke detector devices located throughout the facility (e.g., on different floors and/or in different rooms of the facility) that detect a hazard event, such as smoke generation (e.g., as the result of a fire or otherwise). The aspirating smoke detector can transmit a signal to the control panel in order to notify a building manager, occupants of the facility, emergency services, and/or others of the hazard event via alarms or other mechanisms.

DETAILED DESCRIPTION

Figure 1:
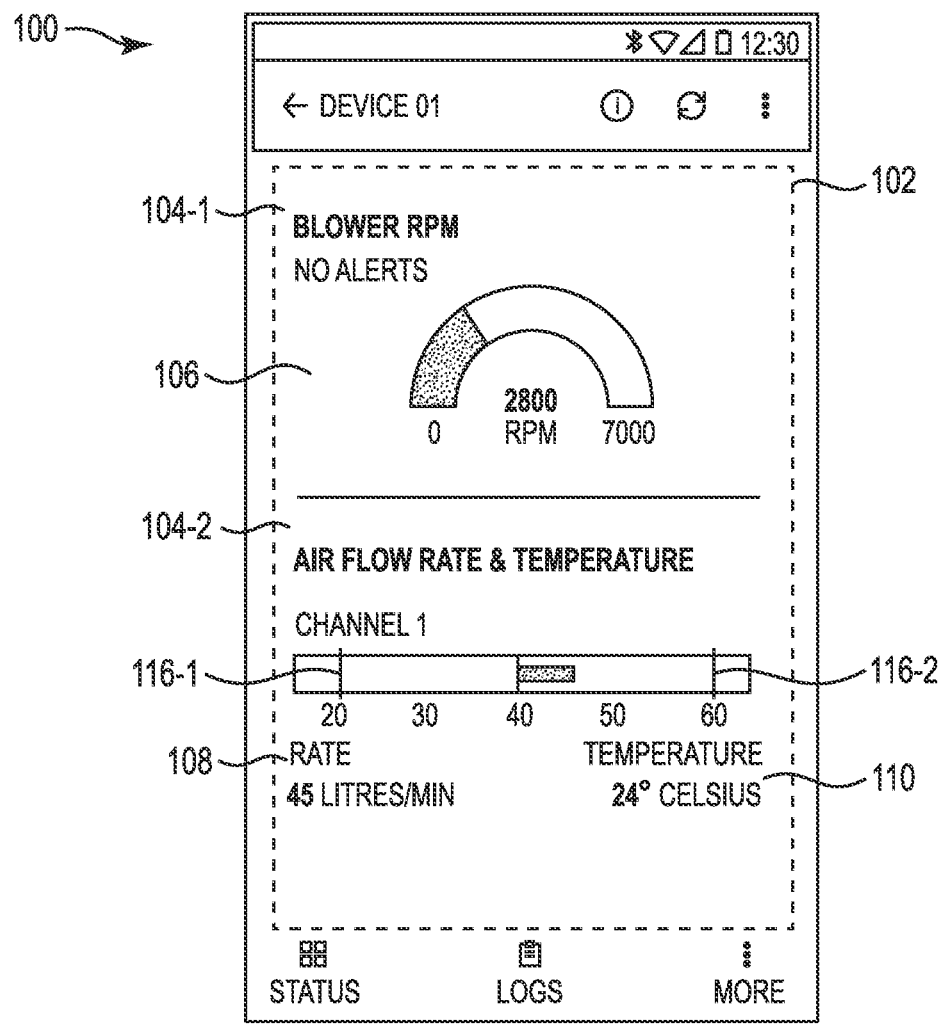
FIG. 1 is an illustration of a display provided on a user interface showing an aspirating smoke detector device operational analysis, generated in accordance with one or more embodiments of the present disclosure.

Methods, devices, and systems for an aspirating smoke detector device operational analysis are described herein. One device includes a memory, and a processor to execute executable instructions stored in the memory to receive operational information associated with an aspirating smoke detector device and generate, using the received operational information, an aspirating smoke detector device operational analysis including a real-time operational parameter associated with the aspirating smoke detector device, and a user interface configured to display the aspirating smoke detector device operational analysis.

An aspirating smoke detector device can be utilized in a facility to detect a hazard event by detecting the presence of smoke. The aspirating smoke detector device can draw gas (e.g., air, via a blower) from the facility into a sensor through a network of pipes throughout the facility. The sensor can sample the gas in order to determine whether the gas includes smoke particles. In response to detection of smoke particles, the aspirating smoke detector device can transmit a signal to a control panel in the facility to signal detection of smoke particles.

An aspirating smoke detector device may monitor various operational parameters associated with the aspirating smoke detector device. For example, the aspirating smoke detector device may monitor a blower speed of a blower of the aspirating smoke detector device, an air flow rate of gas through the aspirating smoke detector device, an air flow temperature of gas through the aspirating smoke detector device, and/or a smoke level of gas through the aspirating smoke detector device, among other operational parameters associated with the aspirating smoke detector device.

Such operational parameters may provide insight to a user regarding the aspirating smoke detector device. For example, it may be beneficial for a user to monitor and/or review the operational parameters of the aspirating smoke detector device in order to determine a state of the aspirating smoke detector device, determine whether the aspirating smoke detector device may have detected smoke (e.g., related to a fire event or other event), predict issues relating to the aspirating smoke detector device and/or the aspirating smoke detection system in the facility, among other information.

Presenting such information via a user interface of a mobile device can allow a user to quickly determine the status of an aspirating smoke detector device in the facility and generate awareness regarding facility safety. Further, the user may modify operational parameters of the aspirating smoke detector device via the user interface. Such presentation and modification functionality can allow for a robust but easy to understand presentation of hazard detection information.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3.

FIG. 1 is an illustration of a display provided on a user interface 100 showing an aspirating smoke detector device operational analysis 102, generated in accordance with one or more embodiments of the present disclosure. As illustrated in FIG. 1, the aspirating smoke detector device operational analysis 102 can include real-time operational parameters 104-1, 104-2 (referred to collectively herein as real-time operational parameters 104). The real-time operational parameters 104 can include a blower speed 106, an air flow rate 108, and an air flow temperature 110.

The aspirating smoke detector device operational analysis 102 can be generated by a mobile device or a tablet (e.g., mobile device 726, as described in connection with FIG. 7) based on operational information associated with an aspirating smoke detector device. Operational information associated with the aspirating smoke detector device can be received by the mobile device from the aspirating smoke detector device located in a facility. Such operational information may be received via a network relationship between the aspirating smoke detector device and the mobile device, as is further described in connection with FIG. 2.

The operational information associated with the aspirating smoke detector device can be data relating to operation of the aspirating smoke detector device. For example, operational information can be data collected by various sensors included with the aspirating smoke detector device during operation of the aspirating smoke detector device. Such data may be utilized to illustrate various operational parameters of the aspirating smoke detector device, as is further described herein.

The mobile device can generate, using the received operational information, the aspirating smoke detector device operational analysis 102. As illustrated in FIG. 1, the aspirating smoke detector device operational analysis 102 can include real-time operational parameters 104 associated with the aspirating smoke detector device, as is further described herein. As used herein, the term "real-time operational parameter" refers to a value relating to operation of a device that is generated within a specified timeframe so as to provide feedback regarding operation of the device. For example, the real-time operational parameters 104 may be values that describe operation of the aspirating smoke detector device, where such values are generated within a short timeframe so as to provide a sufficiently immediate indication of the operation of the aspirating smoke detector device.

As illustrated in FIG. 1, the aspirating smoke detector device operational analysis 102 may include display of multiple real-time operational parameters 104. The real-time operational parameter 104-1 can, for instance, be a blower speed 106 of a blower included in the aspirating smoke detector device. As mentioned above, the aspirating smoke detector device can utilize a blower to draw gas (e.g., air) from the facility into a sensor included in the aspirating smoke detector device. The blower can operate to draw gas into and cause gas to flow through the aspirating smoke detector device. The sensor included in the aspirating smoke detector device can sample the gas to detect the presence of smoke. Such gas can be drawn through a network of pipes throughout the facility into the sensor of the aspirating smoke detector device.

The blower of the aspirating smoke detector device can operate at various speeds as indicated by the blower speed 106. As indicated in FIG. 1, the blower of the aspirating smoke detector device may be operating at 2,800 rotations per minute (RPM).

In some examples, the user interface 100 can display the real-time operational parameters 104 graphically on the user interface 100. For example, the blower of the aspirating smoke detector device can be operating at 2,800 RPM and the blower speed can be indicated graphically on the user interface 100 as a half-circle bar graph. For instance, the lowest blower speed can be 0 RPM and the highest blower speed can be 7,000 RPM. The half-circle bar graph can be "filled" to around ¼ of the way full to indicate that the real-time blower speed is around ¼ (e.g., 2,800 RPM) of the highest blower speed (e.g., 7,000 RPM).

In some examples, the user interface 100 can display the real-time operational parameters 104 as a numerical value on the user interface 100. For example, the blower of the aspirating smoke detector device can be operating at 2,800 RPM and the blower speed can be indicated as a numerical value on the user interface 100 as 2,800 RPM.

Although the aspirating smoke detector device operational analysis 102 is described above as including a blower speed 106, embodiments of the present disclosure are not so limited. For example, the aspirating smoke detector device operational analysis 102 can include multiple real-time operational parameters 104. For instance, the aspirating smoke detector device operational analysis 102 can further include an air flow rate 108 and/or an air flow temperature 110.

The air flow rate 108 can be a real-time operational parameter 104 included in the aspirating smoke detector device operational analysis 102 on the user interface 100. As mentioned above, the blower of the aspirating smoke detector device can draw gas through the aspirating smoke detector device at different speeds, which can result in different air flow rates of the gas through the aspirating smoke detector device.

In some examples, the user interface 100 can display the air flow rate graphically on the user interface 100. For example, the air flow rate of the gas through the aspirating smoke detector device can be 45 liters per minute (L/min) and the air flow rate can be indicated graphically on the user interface 100 as a horizontal bar graph that can be "filled" in a direction to the left of the average flow rate to indicate the air flow rate through the aspirating smoke detector device is 45 L/min and is higher than the reference air flow rate of 40 L/min. In the center of the horizontal bar graph, the reference flow can be indicated via a vertical line on the horizontal bar graph. The aspirating smoke detector device can include a flow rate range, which can be variable. The flow rate range may be, in some examples, plus or minus 20%. For example, the reference flow in FIG. 1 is illustrated as being 40 L/min and the range can be minus 20% (e.g., 32 L/min) to plus 20% (e.g., 48 L/min). However, in other examples, the flow rate range may be plus or minus 50%. For example, the reference flow in FIG. 1 is illustrated as being 40 L/min and the range can be minus 50% (e.g., 20 L/min) to plus 50% (e.g., 60 L/min).

In some examples, the user interface 100 can display the real-time operational parameters 104 as a numerical value on the user interface 100. For example, the air flow rate of the gas through the aspirating smoke detector device can be 45 L/min and the air flow rate can be indicated as a numerical value on the user interface 100 as 45 L/min.

The gas drawn through the aspirating smoke detector device can transit from a space in the facility to the detector and may be drawn at different air flow rates as a result of different blower speeds. Accordingly, the air flow temperature 110 of the gas can be a real-time operational parameter 104 included in the aspirating smoke detector device operational analysis 102 on the user interface 100.

Although not illustrated in FIG. 1 for clarity and so as not to obscure embodiments of the present disclosure, in some examples, the user interface 100 can display the air flow temperature graphically on the user interface 100. For example, the air flow temperature of the gas through the aspirating smoke detector device can be 24 degrees Celsius (° C.) and the air flow temperature can be indicated graphically on the user interface 100 as a horizontal bar graph. For instance, the lowest air flow temperature can be −40° C. and the highest air flow rate can be 55° C. The horizontal bar graph can be "filled" to indicate the air flow temperature through the aspirating smoke detector device is 24° C.

In some examples, the user interface 100 can display the real-time operational parameters 104 as a numerical value on the user interface 100. For example, the air flow temperature of the gas through the aspirating smoke detector device can be 24° C. and the air flow temperature can be indicated as a numerical value on the user interface 100 as 24° C.

As illustrated in FIG. 1, the aspirating smoke detector device operational analysis 102 can include a plurality of real-time operational parameters 104 associated with the aspirating smoke detector device. The aspirating smoke detector device operational analysis 102 can further include, in some examples, threshold levels 116-1, 116-2 (referred to collectively herein as threshold levels 116) associated with each real-time operational parameter 104.

The air flow rate 108 can include threshold levels 116-1, 116-2 shown on the horizontal bar graph. The horizontal bar graph can include a first threshold level 116-1 and a second threshold level 116-2. The first threshold level 116-1 can be, for instance, a lower threshold level of 20 L/min and the second threshold level 116-2 can be a higher threshold level of 60 L/min. In an example in which the real-time air flow rate 108 of the aspirating smoke detector device exceeds the first threshold level 116-1 (e.g., the lower threshold level) or the second threshold level 116-2 (e.g., the higher threshold level), such instance would be displayed graphically on the user interface 100. The real-time operational parameters 104 exceeding a threshold level 116 may indicate an error or problem with the aspirating smoke detector device, the piping network of the aspirating smoke detector device, or any other event which may be useful for a user of the mobile device displaying the user interface 100 to know about. Such a scenario may be displayed on the user interface 100, as is further described in connection with FIGS. 3 and 4.

Figure 2:
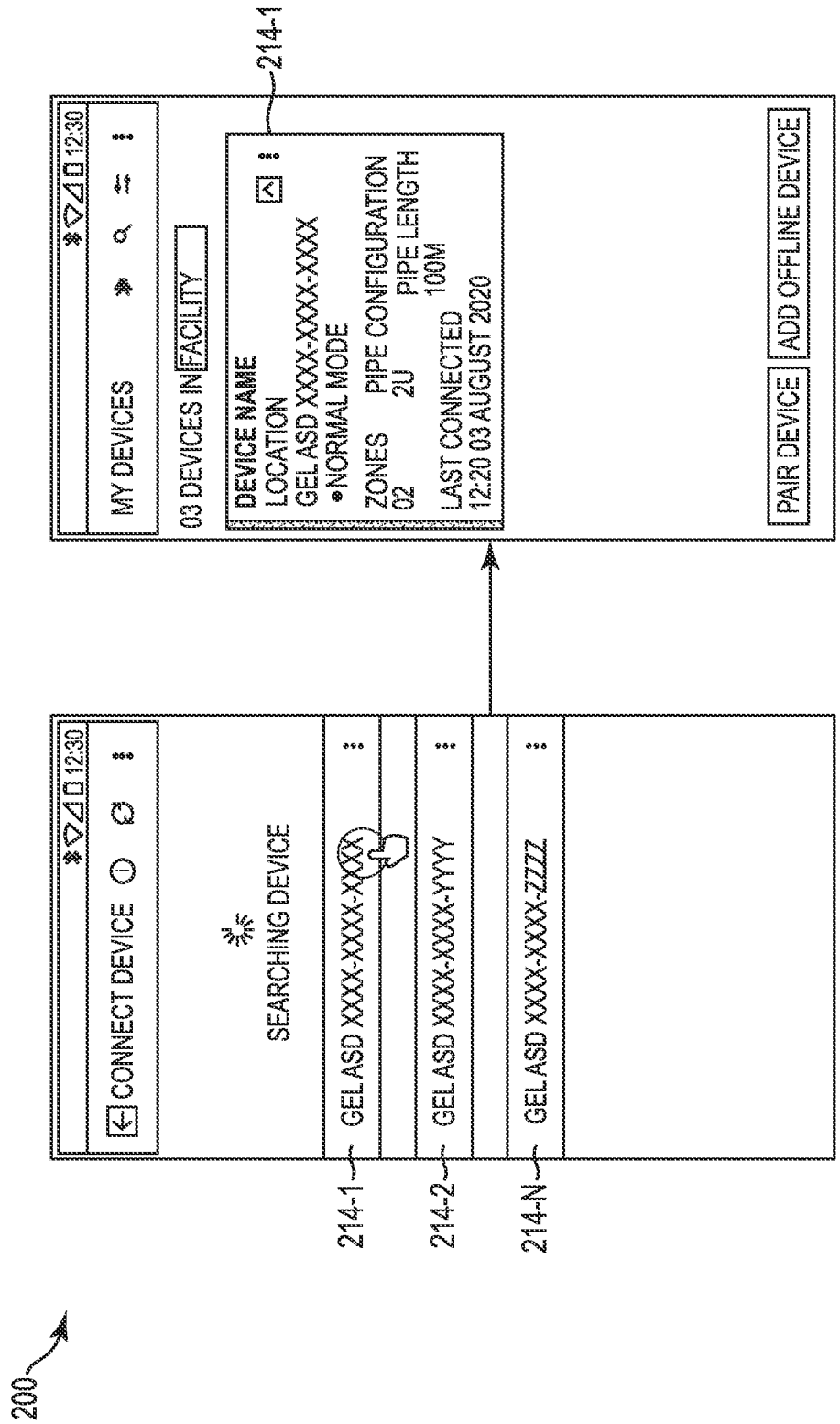
FIG. 2 is an illustration of a display provided on a user interface showing a mobile device connecting with an aspirating smoke detector device, generated in accordance with one or more embodiments of the present disclosure.

FIG. 2 is an illustration of a display provided on a user interface 200 showing a mobile device connecting with an aspirating smoke detector device 214-1, 214-2, 214-N, generated in accordance with one or more embodiments of the present disclosure. The user interface can display various aspirating smoke detector devices 214-1, 214-2, 214-N (referred to collectively herein as aspirating smoke detector devices 214).

As illustrated in FIG. 2, the mobile device can connect to various different aspirating smoke detector devices 214. The mobile device may display, on the user interface 200, aspirating smoke detector devices 214 which are within a threshold distance of the mobile device. As illustrated in FIG. 2, a user may select aspirating smoke detector device 214-1 to connect to (e.g., as illustrated in FIG. 2 as a "cursor" in the shape of a hand with an outstretched finger).

The mobile device may connect to the aspirating smoke detector device 214-1 via a network relationship. The network relationship may be a wired and/or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As mentioned above, the mobile device may connect to the aspirating smoke detector device via a wireless connection. In some examples, the wireless connection can be a Bluetooth connection.

As illustrated in FIG. 2, upon selection of the aspirating smoke detector device 214-1, the user interface 200 can display various attributes about the aspirating smoke detector device 214-1. Such attributes may include an identification number for the aspirating smoke detector device 214-1, its operational mode, its location, its pipe configuration, its pipe length, and/or when the mobile device was last connected with the aspirating smoke detector device 214-1. The mobile device may connect to the aspirating smoke detector device in response to a user selecting the "Pair Device" button via the user interface 200. However, embodiments of the present disclosure are not so limited. For instance, in some examples, the mobile device may automatically pair with the aspirating smoke detector device 214-1 when the mobile device is within a threshold distance of the aspirating smoke detector device 214-1.

In response to the mobile device being connected to the aspirating smoke detector device, the mobile device can receive the operational information. For example, when the mobile device connects with the aspirating smoke detector device 214-1, the aspirating smoke detector device 214-1 can transmit the operational information to the mobile device. In response, the mobile device can generate the aspirating smoke detector device operational analysis for the aspirating smoke detector device 214-1.

Figure 3:
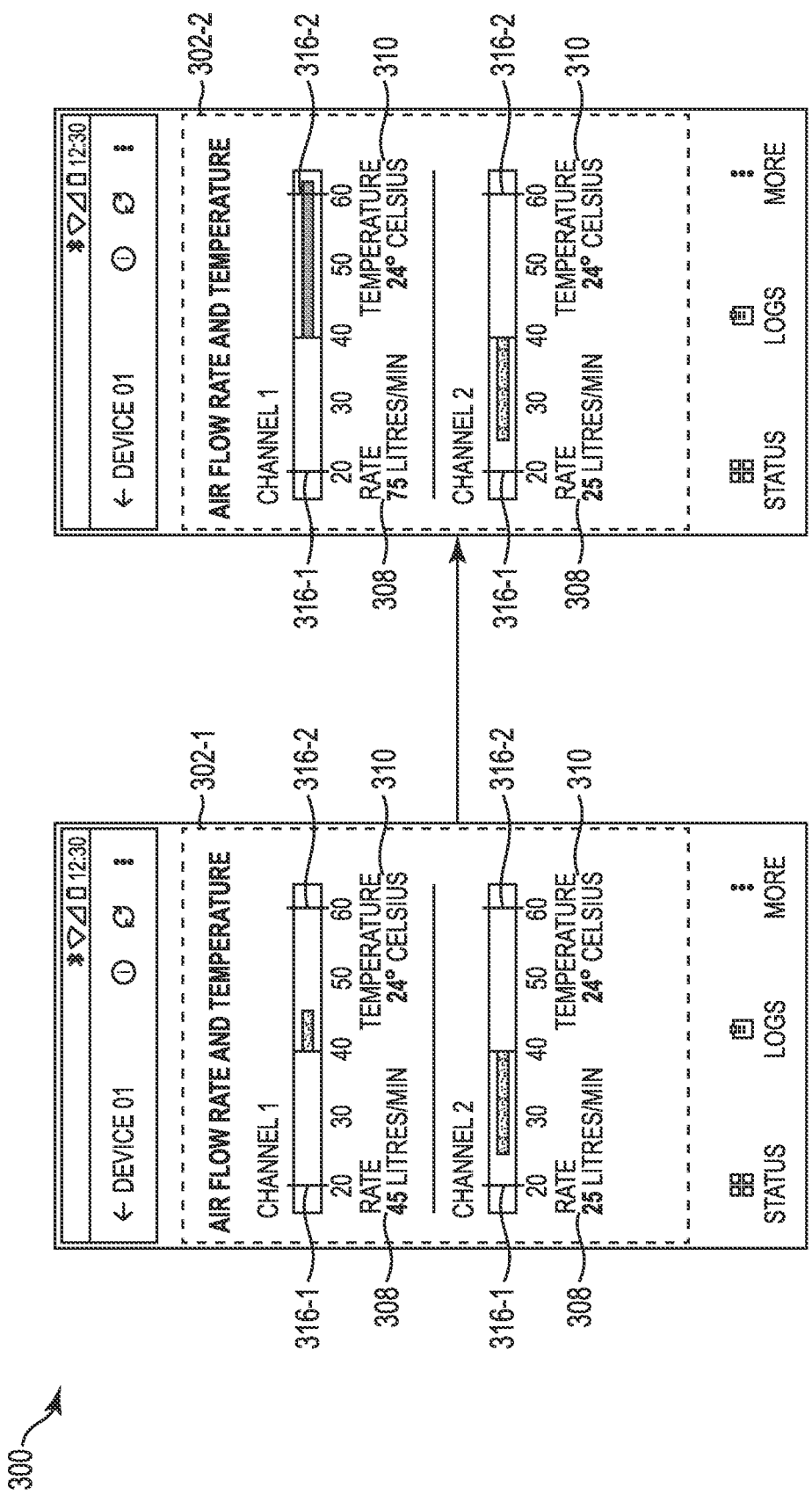
FIG. 3 is an illustration of a display provided on a user interface showing an air flow rate and an air flow temperature of an aspirating smoke detector device, generated in accordance with one or more embodiments of the present disclosure.

FIG. 3 is an illustration of a display provided on a user interface 300 showing an air flow rate 308 and an air flow temperature 310 of an aspirating smoke detector device, generated in accordance with one or more embodiments of the present disclosure. As illustrated in FIG. 3, at a first time, the aspirating smoke detector device operational analysis 302-1 may change at a second time to be aspirating smoke detector device operational analysis 302-2.

As previously described in connection with FIGS. 1 and 2, the mobile device can receive operational information associated with an aspirating smoke detector device in response to a wireless connection being established with the aspirating smoke detector device and generate, using the received operational information, the aspirating smoke detector device operational analysis 302. The aspirating smoke detector device operational analysis 302-1, 302-2 can include real-time operational parameters associated with the aspirating smoke detector device at different times, including an air flow rate 308 of gas through the aspirating smoke detector device and an air flow temperature 310 of the gas through the aspirating smoke detector device.

The aspirating smoke detector device may include two flow channels for gas through the aspirating smoke detector device. The two channels can be displayed on the user interface 300 as "Channel 1" and "Channel 2". During the aspirating smoke detector device operational analysis 302-1, Channel 1 may include an associated air flow rate 308 of 45 L/min, and Channel 2 may include an associated air flow rate 308 of 25 L/min.

As illustrated in FIG. 3, the air flow rate 308 through Channel 1 of the aspirating smoke detector device can be 45 L/min, and can be displayed graphically (e.g., via the horizontal bar graph) and as a numerical value of 45 L/min. Additionally, the air flow rate 308 through Channel 2 of the aspirating smoke detector device can be 25 L/min, and can be displayed graphically (e.g., via the horizontal bar graph) and as a numerical value of 25 L/min.

Additionally, Channel 1 may include an associated air flow temperature of 24° C., and Channel 2 may include an air flow temperature of 24° C. The air flow temperatures of Channel 1 and Channel 2 can be displayed as numerical values of 24° C.

As indicated in the aspirating smoke detector device operational analysis 302-1, the air flow rate 308 in both Channels 1 and 2 may include a first threshold level 316-1 and a second threshold level 316-2. As illustrated in FIG. 3, the air flow rates 308 through both Channel 1 and Channel 2 are within the threshold range defined by the first (e.g., lower) threshold level 316-1 and the second (e.g., upper) threshold level 316-2.

In some examples, the mobile device can color code the real-time operational parameters in the aspirating smoke detector device operational analyses 302. For example, the air flow rate in Channels 1 and 2 may be color coded as green in the horizontal bar graph to indicate the air flow rates do not exceed the first threshold level 316-1 or the second threshold level 316-2 and are within a threshold range.

After a period of time has elapsed since the aspirating smoke detector device operational analysis 302-1 was generated, the real-time operational parameters may change. For example, during the aspirating smoke detector device operational analysis 302-2, Channel 1 may include an associated air flow rate 308 of 75 L/min, whereas Channel 2 may include an associated air flow rate 308 of 25 L/min.

As illustrated in the aspirating smoke detector device operational analysis 302-2, the air flow rate 308 through Channel 1 exceeds the second threshold level 316-2. As a result, the air flow rate 308 through Channel 1 may no longer be within the threshold range defined by the first threshold level 316-1 and the second threshold level 316-2.

The mobile device can color code the air flow rate 308 through Channel 1 in the aspirating smoke detector device operational analyses 302-2 differently based on the air flow rate 308 exceeding the second threshold level 316-2. For example, the air flow rate in Channel 1 may be color coded as red in the horizontal bar graph to indicate the air flow rate 308 through Channel 1 exceeds the second threshold level 316-2 and is outside the threshold range. The air flow rate in Channel 2 may still be color coded as green in the horizontal bar graph to indicate the air flow rate 308 through Channel 2 does not exceed the first threshold level 316-1 or the second threshold level 316-2.

Based on a real-time operational parameter (e.g., the air flow rate 308 in Channel 1) exceeding a threshold level (e.g., threshold level 316-2), the mobile device can generate an alert. The alert may be displayed on the user interface 300.

In some examples, the alert may be an audible alert emitted by a speaker of the mobile device, the alert may be a tactile alert caused by vibration of the mobile device, etc. In some examples, the alert may be transmitted to another computing device to alert the user and/or other users (e.g., in the form of a text message, email, etc.).

Figure 4:
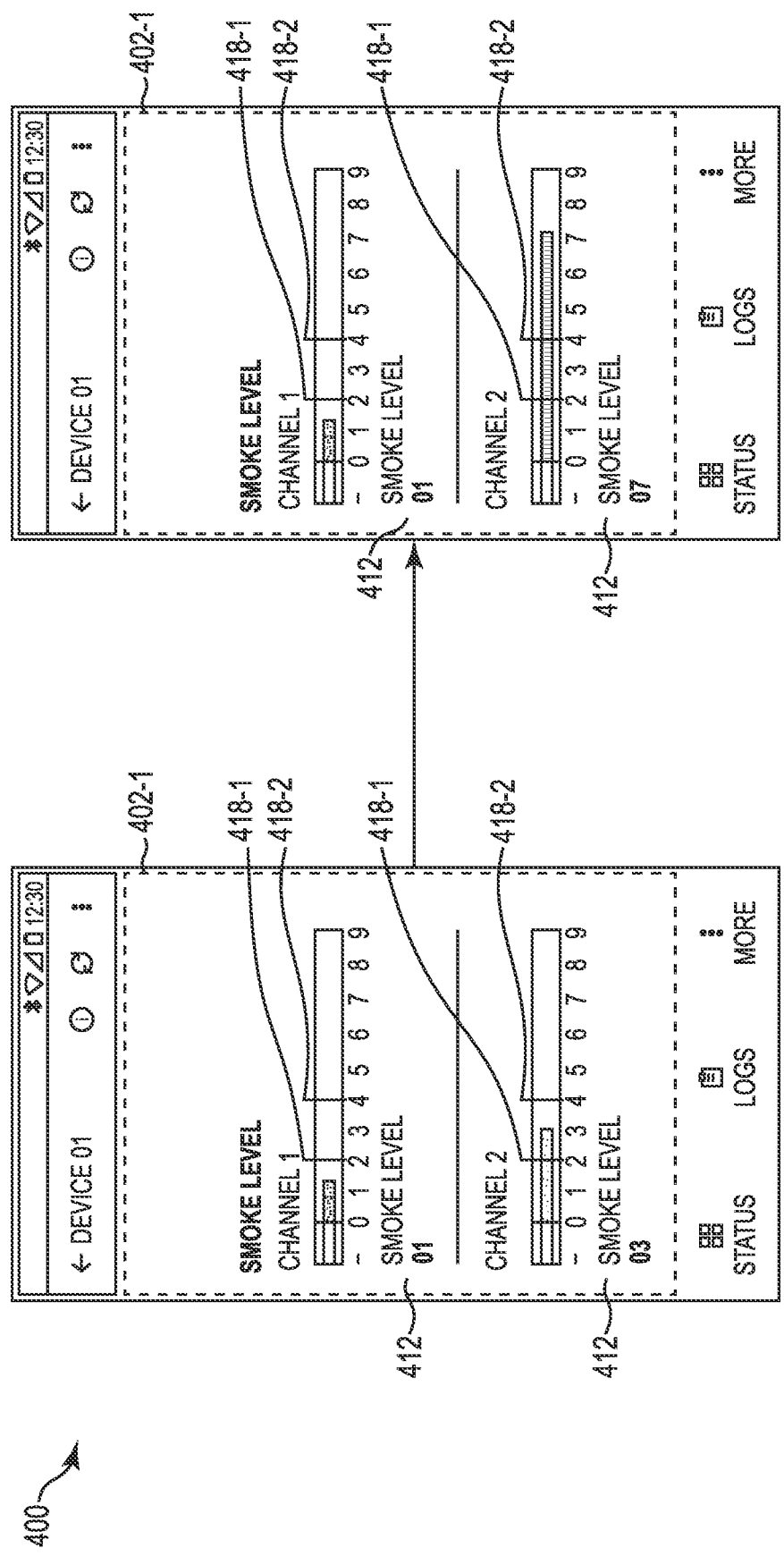
FIG. 4 is an illustration of a display provided on a user interface showing a smoke level of an aspirating smoke detector device, generated in accordance with one or more embodiments of the present disclosure.

FIG. 4 is an illustration of a display provided on a user interface 400 showing a smoke level 412 of an aspirating smoke detector device, generated in accordance with one or more embodiments of the present disclosure. As illustrated in FIG. 4, at a first time, the aspirating smoke detector device operational analysis 402-1 may change at a second time to be aspirating smoke detector device operational analysis 402-2.

Similar to FIG. 3, the mobile device can receive operational information associated with an aspirating smoke detector device and generate the aspirating smoke detector device operational analyses 402-1, 402-2. The aspirating smoke detector device operational analysis 402-1, 402-2 can include real-time operational parameters associated with the aspirating smoke detector device at different times, including a smoke level 412.

The smoke level 412 can be a real-time operational parameter included in the aspirating smoke detector device operational analysis 402-1, 402-2 on the user interface 400. As previously described herein, the blower of the aspirating smoke detector device can draw gas through the aspirating smoke detector device, which can be sampled for smoke particles.

In some examples, the user interface 400 can display the smoke level 412 graphically on the user interface 400. For example, the smoke level of the gas through the aspirating smoke detector device can be smoke level 1 (e.g., in Channel 1) and smoke level 3 (e.g., in Channel 2) and the smoke levels can be indicated graphically on the user interface 400 as a horizontal bar graph. For instance, the lowest smoke level can be 0 and the highest smoke level can be 9. The horizontal bar graph can be "filled" in a direction to the left of the 0 smoke level to indicate the smoke level of the gas through the aspirating smoke detector device as being smoke level 1 in Channel 1 and smoke level 3 in Channel 2.

In some examples, the user interface 400 can display the real-time operational parameters as a numerical value on the user interface 400. For example, the smoke level of the gas through Channel 1 can be smoke level 1 and the smoke level can be indicated as a numerical value on the user interface 400 as Smoke Level 1. Similarly, the smoke level of the gas through Channel 2 can be indicated as a numerical value on the user interface 400 as Smoke Level 03.

As illustrated in FIG. 4, the smoke levels 412 can include a first threshold level 418-1 for an action alert and a second threshold level 418-2 for a fire alert associated with the smoke levels 412. Different thresholds can be set based on an environment the aspirating smoke detector device is installed. For instance, in a dirty environment with a lot of dust, the threshold levels 418 can be set to a lower sensitivity, whereas in a cleaner environment relative to the dirty environment, the threshold levels 418 can be set to a higher sensitivity relative to the dirty environment. The first threshold level 418-1 can be smoke level 2 and the second threshold level 418-2 can be smoke level 4. In the aspirating smoke detector device operational analysis 402-1, the smoke level 412 in Channel 1 can be smoke level 1, which does not exceed the first threshold level 418-1. The mobile device can, in some examples, color code the horizontal bar graph green based on the smoke level in Channel 1 not exceeding the first threshold level 418-1. Color coding the smoke level in Channel 1 green can indicate to a user the smoke level through Channel 1 is not of concern, as there is little to no smoke present in the space in the facility.

Additionally in the aspirating smoke detector device operational analysis 402-1, the smoke level in Channel 2 can be smoke level 3, which does exceed the first threshold level 418-1 but not the second threshold level 418-2. The mobile device can, in some examples, color code the horizontal bar graph orange based on the smoke level in Channel 2 exceeding the first threshold level 418-1 but not the second threshold level 418-2. Color coding the smoke level in Channel 2 orange can indicate to a user the smoke level through Channel 2 is more of a concern, as there may be some amount of smoke present in the space in the facility. In some examples, the mobile device may not generate an alert in response to the smoke level exceeding the first threshold level 418-1 but not the second threshold level 418-2. In response to the smoke level exceeding the first threshold level 418-1, the aspirating smoke detector device is to generate an action alert, and in response to the smoke level exceeding the second threshold level 418-2, the aspirating smoke detector device is to generate a fire alarm. In some examples, the mobile device may also generate an alert in response to the smoke level exceeding the first threshold level 418-1 and/or the second threshold level 418-2.

In the aspirating smoke detector device operational analysis 402-2, the smoke level 412 in Channel 1 can be smoke level 1, which does not exceed the first threshold level 418-1. The mobile device can, in some examples, color code the horizontal bar graph green based on the smoke level in Channel 1 not exceeding the first threshold level 418-1. Color coding the smoke level in Channel 1 green can indicate to a user the smoke level through Channel 1 is not of concern, as there is little to no smoke present in the space in the facility.

Additionally in the aspirating smoke detector device operational analysis 402-2, the smoke level in Channel 2 can be smoke level 7, which exceeds both the first threshold level 418-1 and the second threshold level 418-2. The mobile device can, in some examples, color code the horizontal bar graph red based on the smoke level in Channel 2 exceeding the first threshold level 418-1 and the second threshold level 418-2. Color coding the smoke level in Channel 2 red can indicate to a user the smoke level through Channel 2 is of concern, as there may be a fire related event occurring that is generating smoke in the space in the facility. In some examples, the mobile device may generate an alert in response to the smoke level exceeding the first threshold level 418-1 and the second threshold level 418-2, and the alert may be the same type of alert or a different type of alert as the alert generated in response to the smoke level exceeding the first threshold level 418-1 but not the second threshold level 418-2.

Figure 5:
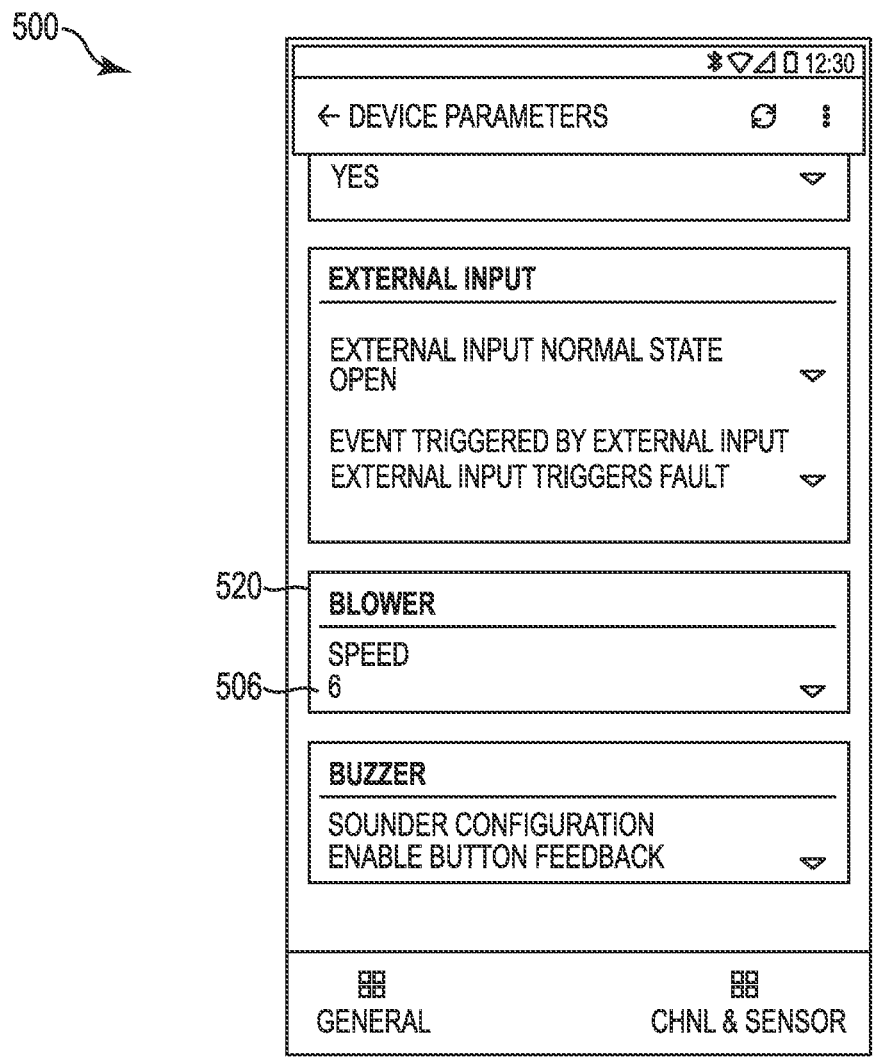
FIG. 5 is an illustration of a display provided on a user interface showing modification of a real-time operational parameter of an aspirating smoke detector device, generated in accordance with one or more embodiments of the present disclosure.

FIG. 5 is an illustration of a display provided on a user interface 500 showing modification of a real-time operational parameter of an aspirating smoke detector device, generated in accordance with one or more embodiments of the present disclosure. As illustrated in FIG. 5, the real-time operational parameter can be a blower speed 506.

In some examples, a user may utilize the mobile device to modify a real-time operational parameter. For example, a user may wish to modify a blower speed of a blower of the aspirating smoke detector device.

As illustrated in FIG. 5, the blower speed may be speed level 6. Such a speed level of 6 may correspond to a blower speed of 2,800 RPM (e.g., as previously described in connection with FIG. 1). Accordingly, the user may wish to increase the blower speed to 3,000 RPM. Accordingly, the user may increase the blower speed level to 8.

The user may increase the blower speed level to 8 via the user interface 500 of the mobile device. For example, the mobile device can receive an input to modify the real-time operational parameter (e.g., the blower speed). The mobile device may receive the input via a touch-screen display. The mobile device can cause the aspirating smoke detector device to modify the real-time operational parameter in response to the user interface receiving the input. For example, the mobile device can receive the input at the modify parameter 520 button displayed on the user interface 500 to change the blower speed level from 6 to 8, and the mobile device can cause the aspirating smoke detector device to increase the blower speed from 2,800 RPM to 3,000 RPM.

Although the blower speed is described above as being modified by changing a blower speed level, embodiments of the present disclosure are not so limited. For example, the user may directly change, via a user input, the blower speed from 2,800 RPM to 3,000 RPM via a different modify parameter 520 button than is illustrated in FIG. 5. Such a different modify parameter 520 button may be a "slider", a numerical input (e.g., a user types in 3,000 via a keyboard/number pad input displayed on the user interface 500), etc.

Additionally, although the blower speed is described above as the real-time operational parameter being modified, embodiments of the present disclosure are not so limited. For example, a user may change other real-time operational parameters (e.g., air flow rate, device sensitivity, etc.).

Figure 6:
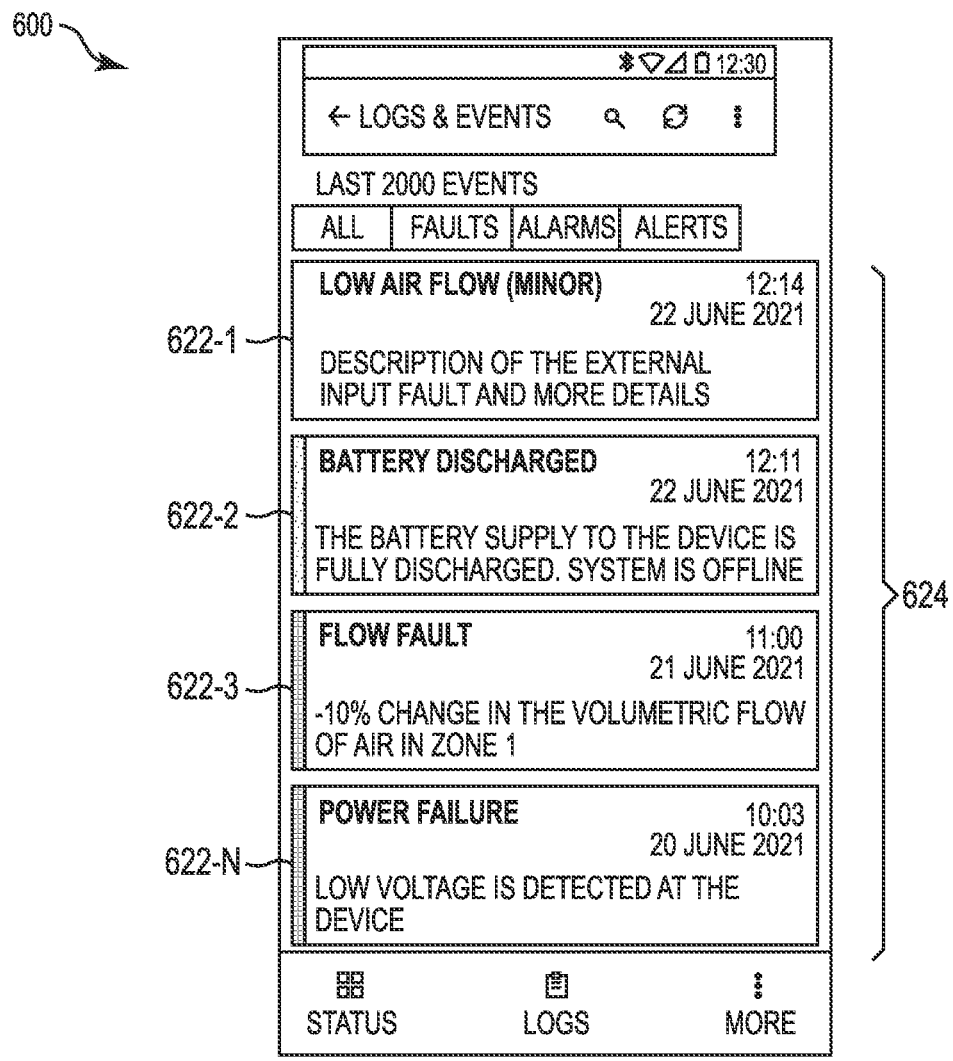
FIG. 6 is an illustration of a display provided on a user interface showing a log of events, generated in accordance with one or more embodiments of the present disclosure.

FIG. 6 is an illustration of a display provided on a user interface showing a log 624 of events 622, generated in accordance with one or more embodiments of the present disclosure. The log 624 may be generated by a mobile device.

As illustrated in FIG. 6, the mobile device can generate a log of the received operational information over time. The received operational information can indicate to a user operational status of the aspirating smoke detector device in the form of events 622-1, 622-2, 622-3, 622-N (referred to collectively herein as events 622). For example, event 622-1 can be a low air flow alert, indicating the air flow rate of the gas through a channel of the aspirating smoke detector device may be low. A user may then investigate the cause of the low air flow rate. Other events 622 may include an event 622-2 indicating a battery powering the aspirating smoke detector device has been discharged, an event 622-3 indicating an air flow fault, an event 622-N indicating the voltage of the aspirating smoke detector device is low, etc. Such events 622 may be determined from the operational information by the mobile device and displayed on the user interface 600 via the log 624.

In some examples, the mobile device may generate a report associated with the log 624. For example, the report may include a description of the operation of the aspirating smoke detector device over a time period, including the log 624 of the events 622, and may be exportable for printing, presentation, etc. In some examples, the report may be displayed on the user interface 600.

An aspirating smoke detector device operational analysis, according to the present disclosure, can allow a user to quickly determine a status of an aspirating smoke detector device, reducing a user's cognitive workload and increasing efficiency. Further, an aspirating smoke detector device operational analysis can allow for problems arising in the aspirating smoke detector device and/or associated network of piping to be identified and fixed, ensuring proper operation of the aspirating smoke detector device in the case of a fire event in the facility.

Figure 7:
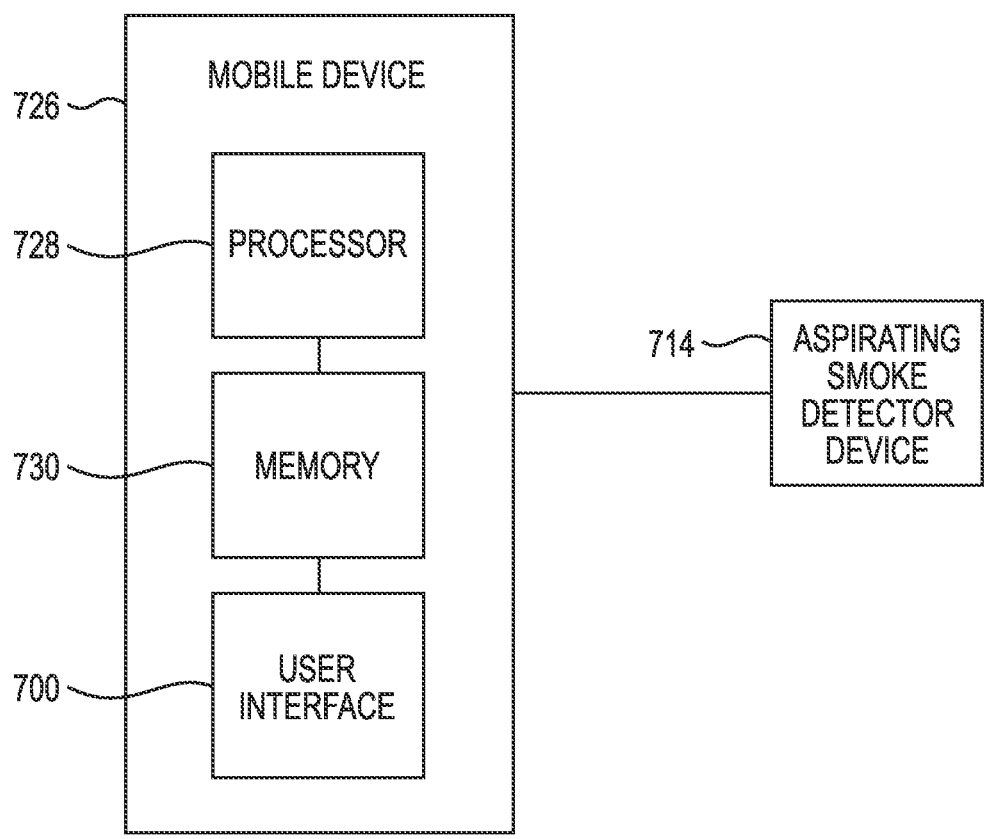
FIG. 7 is a mobile device and an aspirating smoke detector device for an aspirating smoke detector device operational analysis, in accordance with one or more embodiments of the present disclosure.

FIG. 7 is a mobile device 726 and an aspirating smoke detector device 714 for an aspirating smoke detector device operational analysis, in accordance with one or more embodiments of the present disclosure. As illustrated in FIG. 7, the mobile device 726 can include a user interface 700, memory 730, and a processor 728 for an aspirating smoke detector device operational analysis in accordance with the present disclosure.

The mobile device 726 can be, for example, a device that is (or can be) carried and/or worn by a user. For example, the mobile device 726 can be a phone (e.g., a smart phone), a tablet, a personal digital assistant (PDA), smart glasses, and/or a wrist-worn device (e.g., a smart watch), among other types of mobile devices.

The memory 730 can be any type of storage medium that can be accessed by the processor 728 to perform various examples of the present disclosure. For example, the memory 730 can be a non-transitory computer readable medium having computer readable instructions (e.g., computer program instructions) stored thereon that are executable by the processor 728 for an aspirating smoke detector device operational analysis in accordance with the present disclosure. The computer readable instructions can be executable by the processor 728 to redundantly generate the aspirating smoke detector device operational analysis.

The memory 730 can be volatile or nonvolatile memory. The memory 730 can also be removable (e.g., portable) memory, or non-removable (e.g., internal) memory. For example, the memory 730 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 730 is illustrated as being located within mobile device 726, embodiments of the present disclosure are not so limited. For example, memory 730 can also be located internal to another computing resource (e.g., enabling computer readable instructions to be downloaded over the Internet or another wired or wireless connection).

The mobile device 726 can be connected to an aspirating smoke detector device 714. As previously described in connection with FIG. 2, the mobile device 726 can be wirelessly connected to the aspirating smoke detector device 714. In some examples, the mobile device 726 can be wirelessly connected to the aspirating smoke detector device 714 via a Bluetooth connection.

As illustrated in FIG. 7, the mobile device 726 includes a user interface 700. For example, the user interface 700 can display the aspirating smoke detector device operational analysis (e.g., as previously described in connection with FIGS. 1-6) in a display. A user (e.g., operator) of the mobile device 726 can interact with the mobile device 726 via the user interface 700. For example, the user interface 700 can provide (e.g., display and/or present) information to the user of mobile device 726, and/or receive information from (e.g., input by) the user of mobile device 726. For instance, in some embodiments, user interface 700 can be a graphical user interface (GUI) that can provide and/or receive information to and/or from the user of the mobile device 726. The display can be, for instance, a touch-screen (e.g., the GUI can include touch-screen capabilities). Alternatively, a display can include a television, computer monitor, mobile device screen, other type of display device, or any combination thereof, connected to the mobile device 726 and configured to receive a video signal output from the mobile device 726.

The user interface 700 can be localized to any language. For example, the user interface 700 can display the aspirating smoke detector device operational analysis in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A mobile device for an aspirating smoke detector device operational analysis, comprising:
   a memory; and
   a processor configured to execute executable instructions stored in the memory to:
      receive operational information associated with an aspirating smoke detector device in response to the mobile device wirelessly connecting to the aspirating smoke detector device, wherein the mobile device is configured to wirelessly connect to the aspirating smoke detector device in response to the mobile device being within a threshold distance of the aspirating smoke detector device; and
      generate, using the received operational information, an operational analysis of the aspirating smoke detector device.

2. The mobile device of claim 1, wherein the operational analysis includes an operational parameter associated with the aspirating smoke detector device.

3. The mobile device of claim 2, further comprising a user interface configured to display the operational analysis including the operational parameter.

4. The mobile device of claim 3, wherein the user interface is configured to display the operational parameter graphically on the user interface.

5. The mobile device of claim 3, wherein the user interface is configured to display the operational parameter as a numerical value on the user interface.

6. The mobile device of claim 1, wherein the operational information is received from a sensor associated with the aspirating smoke detector device.

7. A non-transitory computer readable medium having computer readable instructions stored thereon that are executable by a processor to:
- receive operational information associated with an aspirating smoke detector device in response to a mobile device wirelessly connecting to the aspirating smoke detector device, wherein the mobile device is configured to wirelessly connect to the aspirating smoke detector device in response to the mobile device being within a threshold distance of the aspirating smoke detector device;
- generate, using the received operational information, an operational analysis of the aspirating smoke detector device including an operational parameter associated with the aspirating smoke detector device; and
- display the operational analysis via a user interface.

8. The non-transitory computer readable medium of claim 7, wherein the computer readable instructions are executable by the processor to display a group of aspirating smoke detector devices to connect to when the group of aspirating smoke detector devices are within the threshold distance of the mobile device.

9. The non-transitory computer readable medium of claim 8, wherein the computer readable instructions are executable by the processor to connect to an aspirating smoke detector device of the group in response to receiving a selection of that aspirating smoke detector device via the user interface.

10. The non-transitory computer readable medium of claim 7, wherein the computer readable instructions are executable by the processor to color code the operational parameter a first color in the display of the operational analysis.

11. The non-transitory computer readable medium of claim 10, wherein the computer readable instructions are executable by the processor to:
- color code the operational parameter a second color in the display of the operational analysis in response to the operational parameter exceeding a first threshold level; and
- color code the operational parameter a third color in the display of the operational analysis in response to the operational parameter exceeding the first threshold level and a second threshold level.

12. The non-transitory computer readable medium of claim 7, wherein the computer readable instructions are executable by the processor to generate an alert in response to the operational parameter exceeding a threshold level.

13. The non-transitory computer readable medium of claim 7, wherein the operational parameter is updated in real-time.

14. A system, comprising:
- an aspirating smoke detector device; and
- a mobile device configured to:
  - receive operational information associated with the aspirating smoke detector device in response to the mobile device wirelessly connecting to the aspirating smoke detector device, wherein the mobile device is configured to wirelessly connect to the aspirating smoke detector device in response to the mobile device being within a threshold distance of the aspirating smoke detector device;
  - generate, using the received operational information, an operational analysis of the aspirating smoke detector device including an operational parameter associated with the aspirating smoke detector device; and
  - display, via a user interface, the operational analysis.

15. The system of claim 14, wherein the aspirating smoke detector device includes a sensor configured to sense the operational information during operation of the aspirating smoke detector device.

16. The system of claim 14, wherein the mobile device is configured to display, via the user interface, an attribute about the aspirating smoke detector device, wherein the attribute includes at least one of:
- an identification number of the aspirating smoke detector device;
- an operational mode of the aspirating smoke detector device;
- a location of the aspirating smoke detector device;
- a pipe configuration of the aspirating smoke detector device; and
- when the mobile device was last connected to the aspirating smoke detector device.

17. The system of claim 14, wherein the operational parameter is one of:
- an air flow rate of gas through a flow channel the aspirating smoke detector device;
- an air flow temperature of the gas through the flow channel of the aspirating smoke detector device;
- a smoke level of the gas through the aspirating smoke detector device; and
- a blower speed of a blower included in the aspirating smoke detector device.

18. The system of claim 14, wherein the user interface is configured to receive an input to modify the operational parameter.

19. The system of claim 18, wherein the mobile device is configured to cause the aspirating smoke detector device to modify the operational parameter in response to the user interface receiving the input.

* * * * *